(12) United States Patent
Haverkamp et al.

(10) Patent No.: US 8,899,022 B2
(45) Date of Patent: Dec. 2, 2014

(54) APPARATUS FOR THE AFTERTREATMENT OF THE EXHAUST GASES OF DIESEL ENGINES

(75) Inventors: Sascha Haverkamp, Jockgrim (DE); Andreas Lang, Hassloch (DE); Michael Wolf, Herxheim (DE)

(73) Assignee: Heinrich Gillet GmbH, Edenkoben (DE)

( * ) Notice: Subject to any disclaimer, the term of this patent is extended or adjusted under 35 U.S.C. 154(b) by 293 days.

(21) Appl. No.: 12/670,309

(22) PCT Filed: Jul. 9, 2008

(86) PCT No.: PCT/EP2008/005570
§ 371 (c)(1),
(2), (4) Date: Jun. 25, 2010

(87) PCT Pub. No.: WO2009/012885
PCT Pub. Date: Jan. 29, 2009

(65) Prior Publication Data
US 2010/0263359 A1   Oct. 21, 2010

(30) Foreign Application Priority Data
Jul. 25, 2007 (DE) .................... 20 2007 010 324 U

(51) Int. Cl.
*F01N 3/00* (2006.01)
*F01N 3/20* (2006.01)

(52) U.S. Cl.
CPC ........... *F01N 3/2066* (2013.01); *F01N 2610/14* (2013.01); *Y02T 10/24* (2013.01); *F01N 2610/02* (2013.01)
USPC .................................. 60/286; 60/303; 60/324

(58) Field of Classification Search
CPC .............. F01N 3/2066; F01N 2240/20; F01N 2610/1453
USPC .............................. 60/303, 324, 286.324, 286
See application file for complete search history.

(56) References Cited

U.S. PATENT DOCUMENTS

| | | | | |
|---|---|---|---|---|
| 3,797,240 A * | 3/1974 | Inoue et al. | | 60/303 |
| 4,571,938 A * | 2/1986 | Sakurai | | 60/303 |
| 4,912,920 A * | 4/1990 | Hirabayashi | | 60/303 |
| 6,442,933 B2 * | 9/2002 | Rusch | | 60/286 |
| 6,722,123 B2 * | 4/2004 | Liu et al. | | 60/286 |
| 2006/0218902 A1 * | 10/2006 | Arellano et al. | | 60/295 |
| 2008/0155973 A1 * | 7/2008 | Maruyama et al. | | 60/299 |
| 2008/0307780 A1 * | 12/2008 | Iverson et al. | | 60/311 |
| 2009/0178395 A1 * | 7/2009 | Huffmeyer | | 60/297 |

FOREIGN PATENT DOCUMENTS

| | | | |
|---|---|---|---|
| DE | 42 03 807 A1 | 8/1993 | |
| DE | 44 17 238 A1 | 9/1994 | |
| EP | 1 262 644 A | 12/2002 | |

\* cited by examiner

*Primary Examiner* — Jesse Bogue
*Assistant Examiner* — Anthony Ayala Delgado
(74) *Attorney, Agent, or Firm* — Wood, Phillips, Katz, Clark & Mortimer

(57) ABSTRACT

An exhaust gas aftertreatment device, including a bent exhaust pipe, a mixing pipe having a closed end at the exhaust pipe bend and a bell-shaped widened portion in at least partial contact with the exhaust pipe at its opposite end, and a nozzle connected to a receptacle in the mixing pipe closed end for injecting an additive into the exhaust gases, with a mixing zone in the exhaust pipe between the urea nozzle and the exhaust pipe outlet in which the exhaust gases flow around the mixing pipe symmetrically and form a double eddy in the mixing pipe.

13 Claims, 2 Drawing Sheets

APPARATUS FOR THE AFTERTREATMENT OF THE EXHAUST GASES OF DIESEL ENGINES

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The invention relates to devices for aftertreatment of exhaust gases of diesel engines.

BACKGROUND OF THE INVENTION

Modern aftertreatment methods for the exhaust gases of diesel engines require the addition of additives to the exhaust gas to allow the respective chemical reactions to take place with optimal effect. Thus, to improve and maintain selective catalytic reduction in the so-called SCR method, ammonia, usually in the form of an aqueous urea solution, must be added to the exhaust gas in a downstream SCR catalyst. Hydrocarbons are added to the exhaust gases to improve and maintain the catalytic function of a diesel oxidation catalyst. Hydrocarbons are also added to the exhaust gases to initiate regeneration of a loaded diesel soot particulate filter.

In many of the aforementioned cases, the additives are injected into the exhaust gas stream in an extremely finely divided form. Then a so-called mixing zone follows downstream from the nozzle, where the exhaust gases and the additives are to be mixed as homogeneously as possible. When using an aqueous urea solution as the additive in particular, this mixing zone must be long enough so that sufficient time remains for the water to evaporate completely.

In addition, it is necessary to ensure that the additives do not come in contact with the pipe wall until it is completely evaporated. Since the pipe wall is usually colder than the exhaust gas itself, the additive would be deposited there. This might result in attack on the pipe but in particular then the proper amount of additive would be missing from the exhaust gas aftertreatment reaction, which would then only take place incompletely. This is unsatisfactory.

The technical world has of course attempted to remedy these disadvantages. In particular it has been proposed that static mixing elements in the form of blades set at a fixed angle, plates and the like should be installed in the mixing zone to achieve a thorough mixing of the two even with a short mixing zone by creating turbulence in the mixture of exhaust gas and additive. Unfortunately, these known proposed approaches have entailed high costs and especially high backpressures. Therefore, there continues to be a substantial demand for technical approaches which will eliminate the disadvantages of the prior art.

SUMMARY OF THE INVENTION

An object of the present invention is to provide a device for aftertreating the exhaust gases of diesel engines, said device being capable of achieving complete evaporation of additives even with a short mixing zone and the most homogeneous possible mixing of exhaust gas and additives as well as preventing additives from being deposited on the inside wall of the pipe of the mixing zone.

This object is achieved by a device as described herein.

It is an essential advantage of the present invention that the exhaust gases enter simultaneously into the mixing pipe from all side simultaneously through the perforations distributed on the circumference of the jacket of the pipe so that the exhaust gases flowing through the mixing pipe are concentrated at the center of the mixing pipe. The exhaust gases concentrated at the center leave the mixing pipe together with the additive that has been injected and then flow through the mixing zone, where the concentration near the center is upheld so that the additives are not deposited on the wall of the mixing zone.

According to the one embodiment of the invention, the widened portion of the mixing pipe is in close contact with the pipe carrying the exhaust gas over the entire circumference, and the conically-shaped part of the widened portion is provided with perforations over a large area. These perforations are in the area of the wall of the downstream mixing zone based on their positioning, so the part of the exhaust gases flowing through these perforations forms a flow near the wall which additionally prevents additives from being able to come out of the mixture flowing at the center of the mixing zone and reach the wall of the mixing zone.

According to one embodiment of the invention, the pipe carrying the exhaust gas is a bend, preferably a 90° bend.

According to an advantageous further embodiment of the invention, the perforations are irregularly distributed in the mixing pipe. Through skilled distribution of these perforations, it is possible to control the quantity of exhaust gases flowing into the mixing pipe distributed around the circumference thereof in a targeted manner so that even with unfavorable external flow conditions, such as those which must be expected with a tight 90' bend, for example, the desired centering of the mixture of exhaust gas and additive is always maintained.

Other objects, features, and advantages of the invention will become apparent from a review of the entire specification, including the appended claims and drawings.

BRIEF DESCRIPTION OF THE DRAWINGS

On the basis of the drawings, the present invention will now be explained in greater detail in the form of one exemplary embodiment, in which.

DETAILED DESCRIPTION OF THE PREFERRED EMBODIMENT

Figure 1:
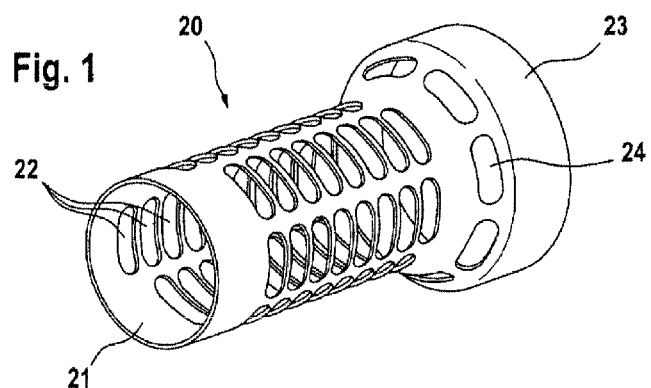
FIG. 1 shows an isometric diagram of a mixing pipe.

FIG. 1 shows an isometric diagram of a mixing pipe 20. The mixing pipe 20 is open at one end 21, with a conical or bell-shaped widened portion 23 at the other end. The pipe jacket is provided with large-area perforations 22. Another ring of perforations 24 is provided on the conical part of the widened portion 23.

Figure 2:
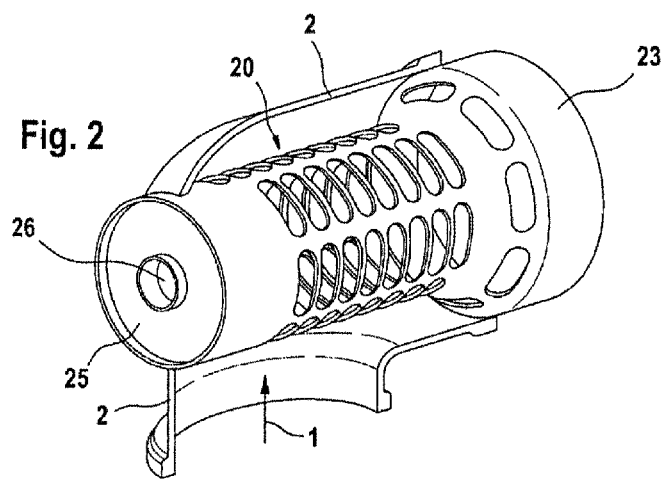
FIG. 2 shows the mixing pipe from FIG. 1, installed in a 90° pipe bend.

FIG. 2 shows the mixing pipe 20 inserted into a pipe 2 carrying exhaust gases, represented by an arrow 1, here in the form of a 90° pipe bend. The open end 21 of the mixing pipe 20 is provided with a closing cover 25, which has a receptacle 26 for a nozzle (not shown) which injects an additive into the mixing pipe 20 and/or the exhaust gases 1. The nozzle may inject an aqueous urea solution, hydrocarbons or other additives into the exhaust gas 1 as needed.

Figure 3:
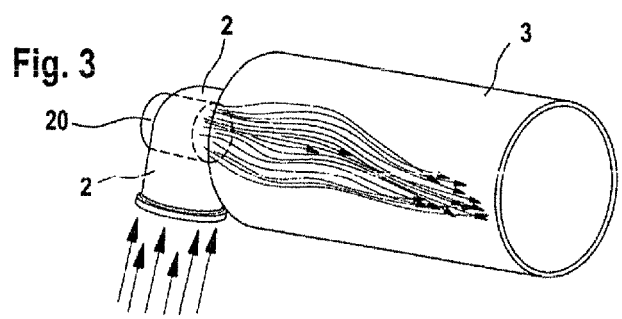
FIG. 3 is an isometric diagram showing a distribution of the mixture of exhaust gas and additive in a mixing zone.

As FIG. 2 also shows, the widened portion 23 on the end of the mixing pipe is of such dimensions that it is in close contact with the inside of the pipe 2 carrying the exhaust gas. In this way, the exhaust gas 1 flowing into the pipe must flow through the perforations 22, 24. The part of the exhaust gases flowing into the perforations 22 in the pipe jacket leads to a concentration of the exhaust gas flow at the center of the mixing pipe 20 and the mixing zone 3, which follows the latter (FIG. 3). However, the part of the exhaust gases flowing through the perforations 24 forms a jacket flow in the downstream mixing zone 3, which effectively protects the mixture of the exhaust gas and the additive from coming in contact with the wall.

FIG. 3 shows the diagram of the flow paths of the mixture of exhaust gas and additive through the mixing pipe 20 and the downstream mixing zone 3 according to a simulation. The flow paths form a helical eddy but do not reach the wall of the mixing zone 3, so nothing is deposited on the wall.

Figure 4:
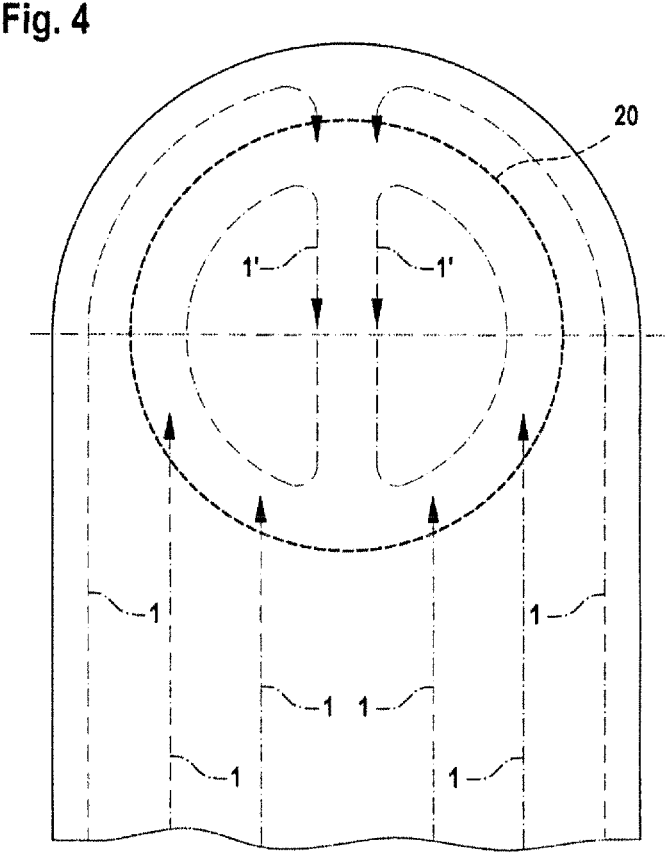
FIG. 4 shows a simplified diagram of the exhaust gas flows out of the pipe carrying the exhaust gas into the mixing pipe.

FIG. 4 shows purely schematically a cross section through the pipe 2 carrying the exhaust gas and through the mixing pipe 20 in a simplified diagram of the exhaust gas flow 1. It can be seen here that based on the symmetrical flow around the mixing pipe 20, a double eddy 1' develops in the interior of the mixing pipe 20, ensuring a homogeneous mixing of the exhaust gas and the additive on the one hand and on the other hand ensuring the concentration of the mixture of exhaust gas and additive at the center of the mixing pipe 20 and the downstream mixing zone 3.

What is claimed is:

1. A device for aftertreating exhaust gases (1) of diesel engines, comprising:
    a supply of additive with a composition to chemically react with diesel engine exhaust gases across an SCR;
    an exhaust pipe (2) through which the exhaust gases (1) flow, said exhaust pipe defined by a pipe wall having a bend therein, wherein said exhaust pipe wall is substantially continuously curved along said bend;
    a urea nozzle for injecting the additive into the exhaust pipe (2) and/or into the exhaust gases (1) at said exhaust pipe bend, said urea nozzle being connected to the exhaust pipe;
    a mixing zone (3) downstream from the urea nozzle; and
    a substantially cylindrical mixing pipe (20) in the exhaust pipe (2), the mixing pipe having an axis and one end extending through the wall of the exhaust pipe (2) at the pipe bend, wherein the mixing pipe (20) includes:
        a first section comprising a substantially constant diameter,
        perforations (22),
        a closing cover (25) on said one end with a receptacle (26) in which the urea nozzle is inserted, said mixing pipe one end being in at least partial contact with the bend of the exhaust pipe (2), and
        a second section comprising a conical or bell-shaped widened portion (23) to contact with the exhaust pipe (2),
    wherein
        the exhaust pipe and mixing pipe are configured and relatively situated so that exhaust gases (1) flow around the mixing pipe (20) symmetrically and form a double eddy (1') in the mixing pipe (20), and
        the gas flow directed against the exhaust pipe bend is progressively redirected by the continuously curved exhaust pipe bend from a path that is at a substantial angle to the mixing pipe axis to a path that is generally aligned with the mixing pipe axis.

2. The device according to claim 1, wherein the widened portion has a circumference and is in tight contact with the exhaust pipe over the entire circumference.

3. The device according to claim 1, wherein the exhaust pipe is bent about 90°.

4. The device according to claim 1, wherein the perforations of the mixing pipe are irregularly distributed.

5. The device according to claim 1, wherein said widened portion has a plurality of the perforations (24).

6. The device according to claim 1, further comprising an opening through said exhaust pipe (2) at the exhaust pipe bend, wherein said mixing pipe one end extends through said exhaust pipe opening.

7. A device for aftertreating exhaust gases (1) of diesel engines, comprising:
    a supply of additive with a composition to chemically react with diesel engine exhaust gases across an SCR;
    an exhaust pipe (2) through which the exhaust gases (1) flow, said exhaust pipe having an input for exhaust gases and an output for exhaust gases and a continuously curved bend between said input and said output;
    a substantially cylindrical mixing pipe (20) extending between a closed first end at said exhaust pipe bend and a second end at said exhaust pipe output, said mixing pipe having an axis and including a receptacle in said first end and first section comprising a substantially constant diameter with perforations (22) formed in the mixing pipe between said first and second ends,
    the mixing pipe further comprising a second section comprising a conical or bell-shaped widened portion (23) extending outwardly from said mixing pipe second end and in contact with the exhaust pipe;
    a urea nozzle connected to the mixing pipe receptacle at the exhaust pipe bend for injecting the additive into the exhaust gases;
    wherein the exhaust pipe and mixing pipe are configured and relatively situated so that the exhaust gases flow around the mixing pipe symmetrically and form a double eddy (1) in the mixing pipe, and
    the gas flow directed against the exhaust pipe bend is progressively redirected by the continuously curved exhaust pipe bend from a path that is at a substantial angle to the mixing pipe axis to a path that is generally aligned with the mixing pipe axis.

8. The device according to claim 7, wherein the widened portion has a circumference and is in tight contact with the exhaust pipe over the entire circumference.

9. The device according to claim 7, wherein the exhaust pipe is bent about 90°.

10. The device according to claim 7, wherein the perforations of the mixing pipe are irregularly distributed.

11. The device according to claim 7, wherein said widened portion has a plurality of the perforations (24).

12. The device according to claim 7, further comprising an opening through said exhaust pipe (2) at the exhaust pipe bend, wherein said mixing pipe first end extends through said exhaust pipe opening.

13. A device for aftertreating exhaust gases (1) of diesel engines, comprising:

a supply of additive with a composition to chemically react with diesel engine exhaust gases across an SCR;

an exhaust pipe (2) through which the exhaust gases (1) flow, said exhaust pipe having an input for exhaust gases and an output for exhaust gases with a continuously curved bend between said input and said output;

a substantially cylindrical mixing pipe (20) extending between a closed first end at said exhaust pipe bend and a second end at said exhaust pipe output, said mixing pipe having an axis and including a receptacle in said first end and a first section comprising a substantially constant diameter with perforations (22) formed in the mixing pipe between said first and second ends, the mixing pipe further comprising a second section comprising a conical or bell-shaped widened portion (23) extending outwardly from said mixing pipe second end and in contact with the exhaust pipe;

a urea nozzle connected to the mixing pipe receptacle at the exhaust pipe bend for injecting the additive into the exhaust gases; and a mixing zone (3) downstream from the urea nozzle, the exhaust pipe and mixing pipe configured and relatively situated so that the gas flow directed against the exhaust pipe bend is progressively redirected by the continuously curved exhaust pipe bend from a path that is at a substantial angle to the mixing pipe axis to a path that is generally aligned with the mixing pipe axis.

\* \* \* \* \*

UNITED STATES PATENT AND TRADEMARK OFFICE
CERTIFICATE OF CORRECTION

| | |
|---|---|
| PATENT NO. | : 8,899,022 B2 |
| APPLICATION NO. | : 12/670309 |
| DATED | : December 2, 2014 |
| INVENTOR(S) | : Sascha Haverkamp et al. |

It is certified that error appears in the above-identified patent and that said Letters Patent is hereby corrected as shown below:

On the Title Page, item (30) Foreign Application Priority Data should read as follows:

July 25, 2007  (DE) ............................. 20 2007 010 324.7

Signed and Sealed this
Twelfth Day of May, 2015

Michelle K. Lee
*Director of the United States Patent and Trademark Office*